(No Model.)

H. SMALL.
DRIVING BIT FOR HARNESS.

No. 540,408. Patented June 4, 1895.

Witnesses
Andrew Ferguson
Scott H. Smith

Inventor
Henry Small
By W. E. Simonds
Attorney

UNITED STATES PATENT OFFICE.

HENRY SMALL, OF HARTFORD, CONNECTICUT, ASSIGNOR, BY DIRECT AND MESNE ASSIGNMENTS, TO JESSIE D. SMALL, OF SAME PLACE, AND WILLIAM E. SIMONDS, OF CANTON, CONNECTICUT.

DRIVING-BIT FOR HARNESS.

SPECIFICATION forming part of Letters Patent No. 540,408, dated June 4, 1895.

Application filed April 15, 1895. Serial No. 545,699. (No model.)

*To all whom it may concern:*

Be it known that I, HENRY SMALL, a citizen of the United States of America, residing at Hartford, in the county of Hartford and State of Connecticut, have invented a certain new and useful Improvement in Driving-Bits for Horses, of which the following is a description, reference being had to the accompanying drawings, wherein—

Figure 1:
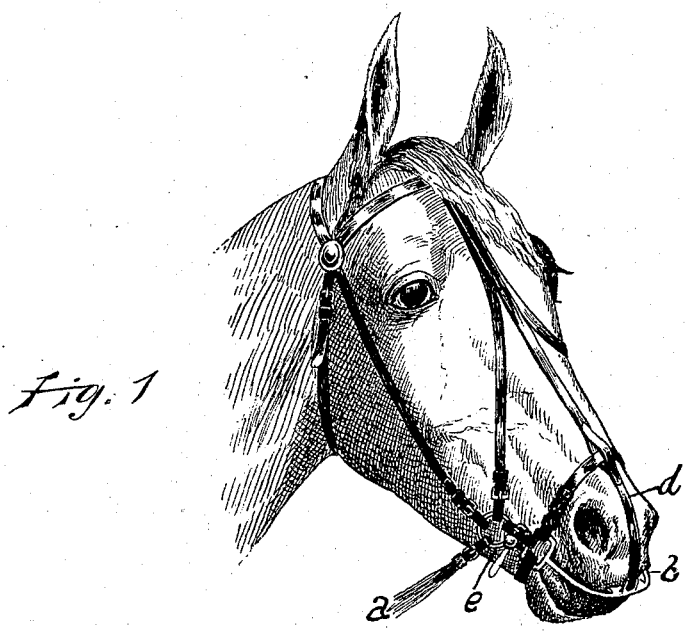
Figure 2:
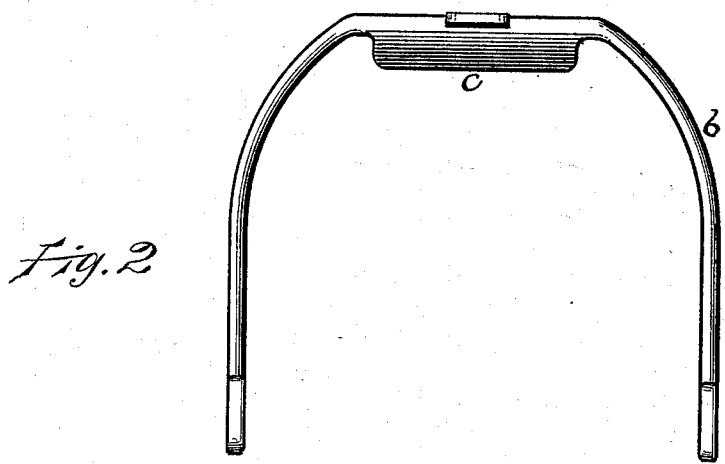

Figure 1 is a view of the head of a horse bearing said improvement. Fig. 2 is a detail top view of the bail hereinafter mentioned.

The said improvement is a device in the nature of a bit for driving a horse, usable either with or without the ordinary bit; and its object and purpose are to make guidance and stoppage of the horse easy and certain. It is specially useful in controlling vicious horses and in breaking colts.

The ordinary reins, such as are generally used for driving a horse, are denoted (only one being in sight in the drawings) by the letter $a$. My improved bit is used in connection with, and is operated by means of, these ordinary reins.

The essentially new feature of my bit is the bail $b$ so supported that it encompasses the upper lip of the horse below the nostrils. This bail is, by preference, made of steel and furnished, inside, with the pressure-boss $c$ for contact with, and pressure upon, the upper lip of the horse.

The location of the bail, below the nostrils, and so as to bear on the upper lip of the horse when the driver pulls backward upon the reins, is an essential matter, for in this lip is located a most sensitive nerve or set of nerves, possibly the most sensitive to be found in the organization of the horse.

The letter $d$ denotes a strap suitably connected to the bridle or harness at its upper end, and, at its lower front end, supporting the front of the bail $b$ so that it lies across the lip and below the nostrils. Any support for the bail which will bring the front of the bail in front of the upper lip of the horse and below the nostrils performs the essential functions of this strap. The rear ends of the bail $b$ may be connected directly to the ordinary reins $a$ or the ordinary bit $e$ may be interposed.

The horse may be guided, stopped and driven by the use of the bail, and without the presence of the ordinary bit, or the two devices may be used in conjunction. In either case, the bail is the more effective instrument in guiding and stopping a horse that is vicious or that becomes frightened. In using the two bits in conjunction it is practicable to so adjust the two that the ordinary bit will come into action a little in advance of the bail.

I claim as my improvement—

1. The combination of the ordinary driving reins $a$, the bail $b$ encompassing the upper lip of the horse, and a support for the bail locating it below the nostrils, all substantially as described and for the purposes set forth.

2. The combination of the ordinary driving reins $a$, the bail $b$ provided with the pressure-boss $c$, and a support for the bail locating it below the nostrils, all substantially as described and for the purposes set forth.

3. The combination of the ordinary driving reins $a$, the ordinary bit $e$, the bail $b$ encompassing the upper lip of the horse, and a support for the bail locating it below the nostrils, all substantially as described and for the purposes set forth.

4. The combination of the ordinary driving reins $a$, the bail $b$ encompassing the upper lip, and the strap $d$ supporting the bail below the nostrils, all substantially as described and for the purposes set forth.

HENRY SMALL.

Witnesses:
 W. E. SIMONDS,
 ANDREW FERGUSON.